United States Patent [19]
May

[11] Patent Number: 6,125,422
[45] Date of Patent: Sep. 26, 2000

[54] DEPENDENT BANK MEMORY CONTROLLER METHOD AND APPARATUS

[75] Inventor: Bradley A. May, San Jose, Calif.

[73] Assignee: Rambus Inc, Mountain View, Calif.

[21] Appl. No.: 09/271,611

[22] Filed: Mar. 17, 1999

[51] Int. Cl.[7] ................................................ G06F 12/00
[52] U.S. Cl. ..................................... 711/5; 711/3
[58] Field of Search ............................................ 711/3, 5

[56] References Cited

U.S. PATENT DOCUMENTS 5,787,457  7/1998  Miller et al. ............................ 711/105

*Primary Examiner*—Jack A. Lane
*Attorney, Agent, or Firm*—Pennie & Edmonds LLP

[57] ABSTRACT

A memory controller is used in conjunction with a plurality of dynamic memory devices (DRAM's). Each DRAM device has a plurality of adjacent dependent banks of memory cells. The memory controller has a cache. Each entry in the cache corresponds to one bank in one of the dynamic memory devices, and stores information indicating which of the dynamic memory devices the entry corresponds to, whether the bank to which the entry corresponds is open, and which row of the bank was last accessed. Bank status lookup logic is used to access cache entries in response to a memory access request that includes a bank address, a device address and a row address. The bank status lookup logic retrieves an entry, if any, in the cache corresponding to the device address and bank address. It also simultaneously retrieves entries, if any, in the cache for banks physically adjacent to the bank identified by the device address and bank address. Reduction logic converts the information in the retrieved cache entries into a selection signal, and a protocol state machine lookup outputs a sequence of control signals in accordance with the selection signal. The control signals are sent to the dynamic memory devices to service the memory access request. Control signal issuing circuitry issues control signals in accordance with the one or more control values.

20 Claims, 9 Drawing Sheets

DEPENDENT BANK MEMORY CONTROLLER METHOD AND APPARATUS

The present invention relates generally to a memory controller for dynamic random access memory (DRAM) devices, and more particularly to a memory controller for DRAM devices that include multiple (dependent) banks of memory cells that each share sense amplifiers with one or more neighboring banks.

BACKGROUND OF THE INVENTION

A dynamic random access memory (DRAM) contains an array of storage elements, often called memory cells, each storing one bit of data. At the lowest level, these elements are organized into rows and columns, where one row may be accessed at a time. From the row, certain columns are selected to perform a read or write operation.

Referring to FIG. 1, a single DRAM device 100 may contain multiple internal storage arrays organized as banks 102. A bank 102 is a storage array 104 and its associated sense amp (sense amplifier) arrays 106. The memory array in a 64 Mbit RAMBus DRAM (RDRAM) typically contains 16 banks. Each unique device, bank, and row combination is called a page.

Banks in a DRAM can be independent or dependent. Independent banks each have their own sense amp arrays, independent of all other banks. Each bank can operate independently of its adjacent banks. To reduce the width of the bank in silicon, an independent bank has two dedicated sense amp arrays, one above and one below. The sense amp arrays are attached to alternating columns in the storage array.

An independent bank can be in one of two states: open or closed. An open bank has had the contents of one row transferred to a sense amp array, from where it may be rapidly accessed by a so-called column operation. Access to a closed bank requires a row operation to transfer the contents of the desired row to the sense amp cache before the column operation, and is much slower than access to an open bank.

Referring to FIG. 2, there is shown a DRAM device 110 having dependent banks 112. As shown, dependent banks share adjacent sense amp arrays 114. For instance, neighbor banks n and n+1 share the sense amp array positioned between the DRAM cell arrays for those two banks. This reduces the area occupied by sense amplifiers because only N+1 sense amp arrays are required, instead of the 2N sense amp arrays used in the device of FIG. 1, where N is the number or banks. But because it shares sense amp arrays with adjacent banks (called neighbor banks or just neighbors), a dependent bank cannot operate independently of its neighbors. When a dependent bank accesses its sense amp arrays, its neighbors must be closed.

A dependent bank that is closed and has a neighbor open is said to be locked. Locked banks cannot be opened until all neighbor banks are closed. As a convenience, the DRAM's internal logic is arranged so that a precharge operation on any bank will also close its neighbor banks. In other words, whenever a bank is precharged, the sense amp arrays for both it and its neighbors are precharged. If the bank is an edge bank at the end of the bank array, three sense amp arrays are precharged, and otherwise four sense amp arrays are precharged. As a result, a locked bank can be accessed by a precharge operation, a row operation, and then a column operation.

Still referring to FIG. 2, a bankset is a set of two or three dependent banks. The banks at each end in a DRAM device having a dependent bank organization form a bankset with two banks, because they do not share one of their sense amp arrays. All other banks in the DRAM device must form a bankset with three banks, because they share both associated sense amp arrays.

The present invention provides a memory controller apparatus and method to control a set of DRAM devices, each DRAM device being composed of several dependent banks. Among the tasks, the memory controller is responsible for its managing and tracking the state of each bank in the system: open, closed, or (for dependent banks only) locked. From a general perspective, two types of bank control policies that a memory controller could use for managing the bank state of the banks in a multiple bank DRAM are open-page and closed-page.

The closed-page policy is to close (i.e., precharge) the bank used in a memory access operation after every access. This is simplest because there is no need to track the state of any banks. If a bank is not being used, it is closed.

The open-page policy would leave each page (i.e., row of a bank) open as long as possible. If subsequent requests frequently select the same page (this is the case for many applications) row operations are avoided and performance is improved. How long the page can be left open is limited by two factors: bank dependencies (only one page may be open in a bank at a time, and a dependent bank must be closed before opening its neighbor) and the ability of the memory controller to track which banks are open. Because of the assumed difficulties in controlling dependent bank DRAMs, prior art memory controllers have not included logic for keeping pages open as long as possible in dependent bank DRAM devices.

If it is an object of the present invention to provide a memory controller for dependent bank DRAM devices that allows each open page to remain open until another memory operation logically requires that page to be closed.

Another object of the present invention is to provide a memory controller for dependent bank DRAM devices that simultaneously accesses state information for an addressed bank and state information for its neighboring banks from a cache of bank state information, and then utilizes that information to determine the minimum number of control packets needed to service a specified memory request.

SUMMARY OF THE INVENTION

In summary, the present invention is a memory controller for controlling a plurality of dynamic memory devices (DRAM's). Each DRAM device has a plurality of adjacent dependent banks of memory cells. The memory controller has a cache. Each entry in the cache corresponds to one bank in one of the dynamic memory devices, and stores information indicating which of the dynamic memory devices the entry corresponds to, whether the bank to which the entry corresponds is open, and which row of the bank was last accessed.

Bank status lookup logic is used to access cache entries in response to a memory access request that includes a bank address, a device address and a row address. The bank status lookup logic retrieves an entry, if any, in the cache corresponding to the device address and bank address. It also simultaneously retrieves entries, if any, in the cache for banks physically adjacent to the bank identified by the device address and bank address.

Reduction logic converts the information in the retrieved cache entries into a selection signal, and a protocol state machine issues a sequence of control signals (also called row and column packets) in accordance with the selection signal. The control signals are sent to the dynamic memory devices to service the memory access request.

The reduction logic may include logic for generating update signals to indicate whether entries in the cache corresponding to banks physically adjacent to the identified bank should be updated to indicate that those banks are closed.

In one embodiment, the bank status lookup logic includes a binary decoder that decodes the bank address into a set of binary decoded signals, logic connections for left-shifting and right-shifting the binary decoded signals to generate left-shifted and right-shifted signals, OR gates for logically ORing the binary decoded signals and the left-shifted and right-shifted signals to generate a group of neighbor select signals. The logic connections and OR gates generate a group of three neighbor select signals whenever the identified bank is neither a predefined top bank nor a predefined bottom bank, and otherwise generate a group of two neighbor select signals. The neighbor select signals are used to simultaneously access cache entries potentially corresponding to the identified bank and banks physically adjacent to the identified bank.

In some embodiments the bank status lookup logic may include three parallel busses for simultaneously transmitting information from three cache entries to the reduction logic, a modulo three decoder for decoding the bank address to generate a set of three binary modulo signals, and steering logic that couples the three parallel busses to three ports of the reduction logic in accordance with the three binary modulo signals.

In a preferred embodiment
  whenever a bank physically adjacent to the identified bank identified is open, the sequence of control signals sent to the memory devices includes control signals for precharging the bank identified by the device address and bank address before the row identified by the row address is accessed;
  when the identified bank and its neighbors are closed, the sequence of control signals sent to the memory devices includes control signals for activating the identified bank and a column packet for accessing a specified column;
  when the identified bank is closed and a different device has a open bank with the same bank address, the sequence of control signals sent to the memory devices includes control signals for precharging (closing) the bank having the same bank address and different device address than the identified bank;
  when the identified bank is open, but the row last accessed in the identified bank does not match the row address, the sequence of control signals sent to the memory devices includes control signals for precharging the bank identified by the device address and bank address before the row identified by the row address is accessed; and
  when the identified bank is open, and the row last accessed in the identified bank matches the row address, the sequence of control signals sent to the memory devices includes control signals (e.g., a column packet) for accessing the specified bank, row and column without precharging the bank identified by the device address and bank address.

In every case, the sequence of control packets for implementing a memory read or write request includes a column packet to access the selected column(s).

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
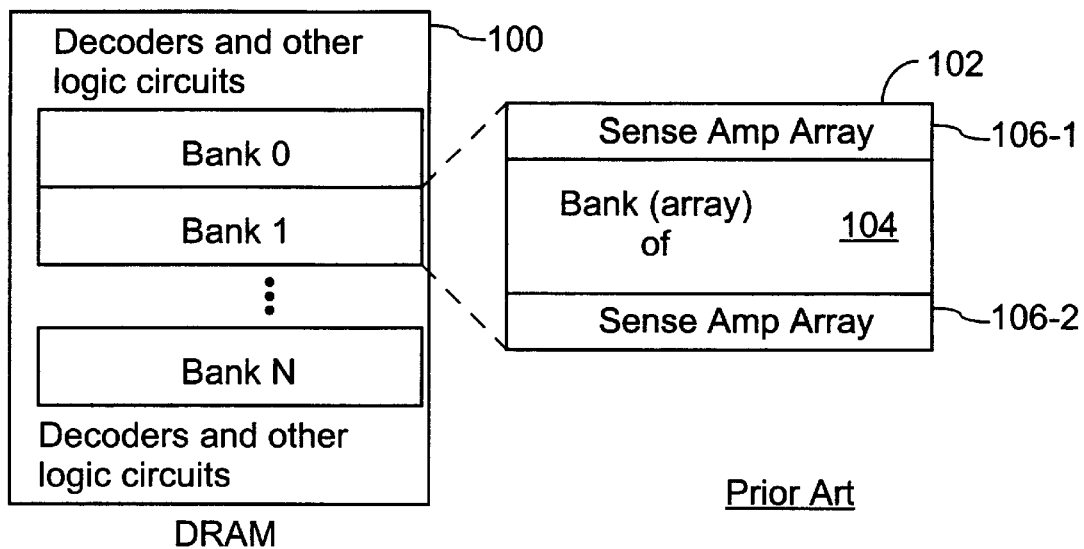
FIG. 1 is a block diagram of a dynamic random-access memory device having independent banks.
Figure 2:
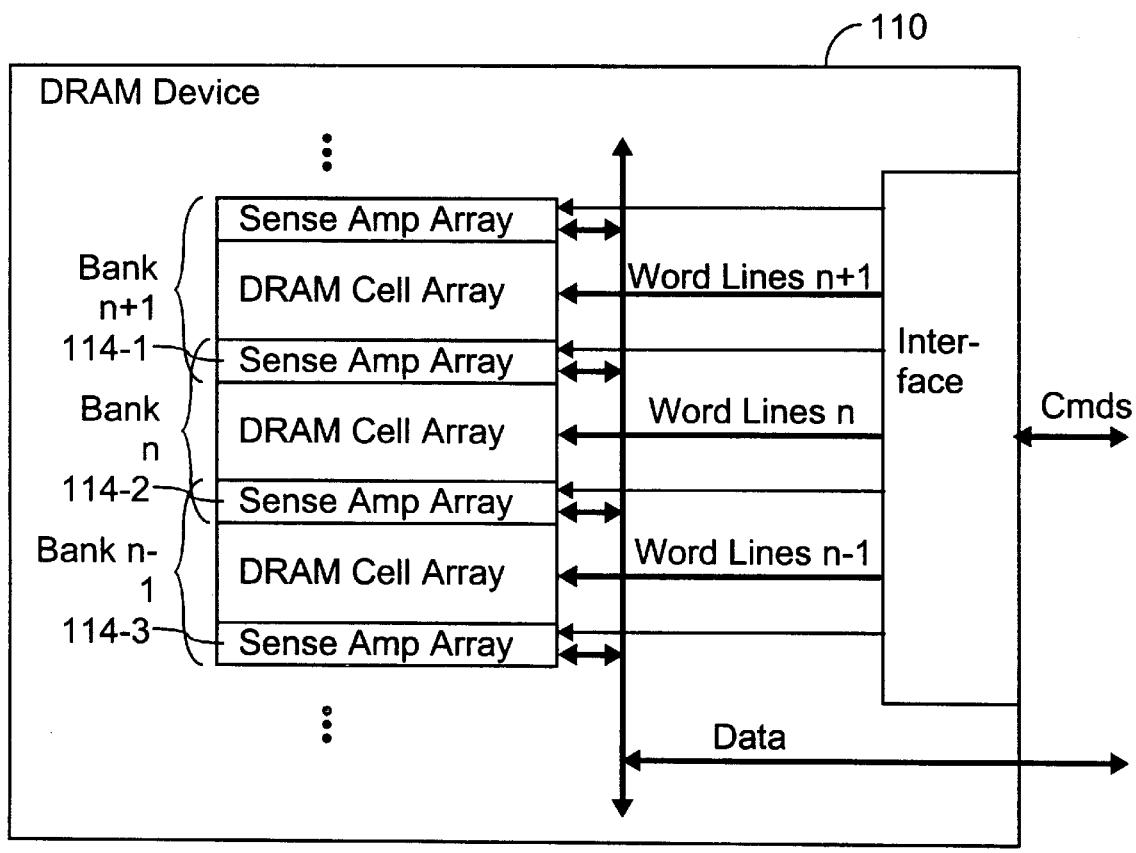
FIG. 2 is a block diagram of a dynamic random-access memory device having dependent banks.
Figure 3:
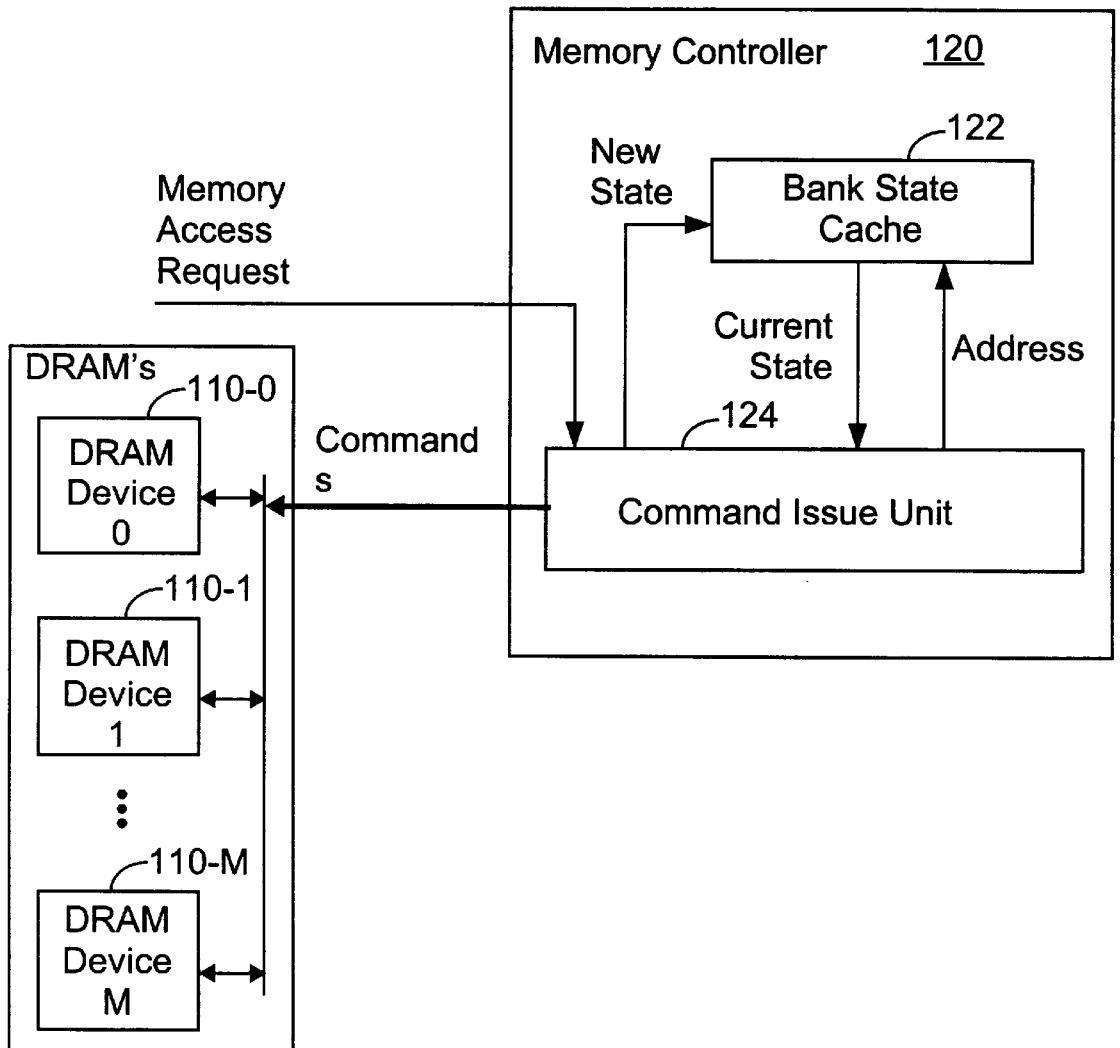
FIG. 3 is a block diagram of a memory controller in accordance with the present invention.

Referring to FIG. 3, there is shown a memory controller 120 for controlling a plurality of dynamic memory devices (DRAM's) 110. As discussed above, each DRAM device 110 has a plurality of adjacent dependent banks of memory cells and the memory controller 120 is specially configured to optimize performance. In particular, the memory controller 120 enables efficient page mode access whenever a memory access request is directed at a memory bank that is open and the row to which the memory access request is directed is already stored in a sense amp array for that bank.

The memory controller 120 has a cache 122 and a command issue unit 124. In a preferred embodiment, the cache 122 has thirty-two entries. The purpose of the cache is to store information about the status of up to thirty-two banks in the set of memory devices 110 being controlled by the memory controller 120.

Figure 4:
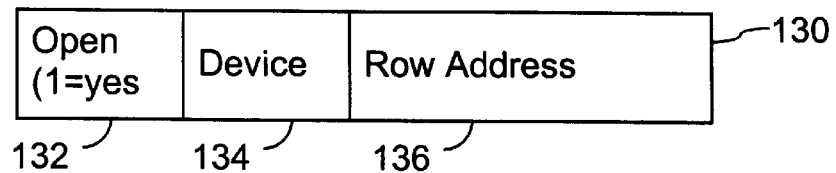
FIG. 4 shows the fields of a cache entry for the bank state cache shown in FIG. 3.

Referring to FIG. 4, each entry 130 in the cache corresponds to one bank in one of the dynamic memory devices, and stores information indicating which of the dynamic memory devices the entry corresponds to (device address 134), whether the bank to which the entry corresponds is open (open flag 132), and which row of the bank was last accessed (row address 136). In the embodiment shown in FIG. 4, the open flag 132 occupies one bit, the device address occupies five bits and the row address eleven bits of the cache entry. More generally, the size of the device and row address fields of the cache entry are determined by the maximum number of DRAM devices and the number of rows in each bank.

Figure 5:
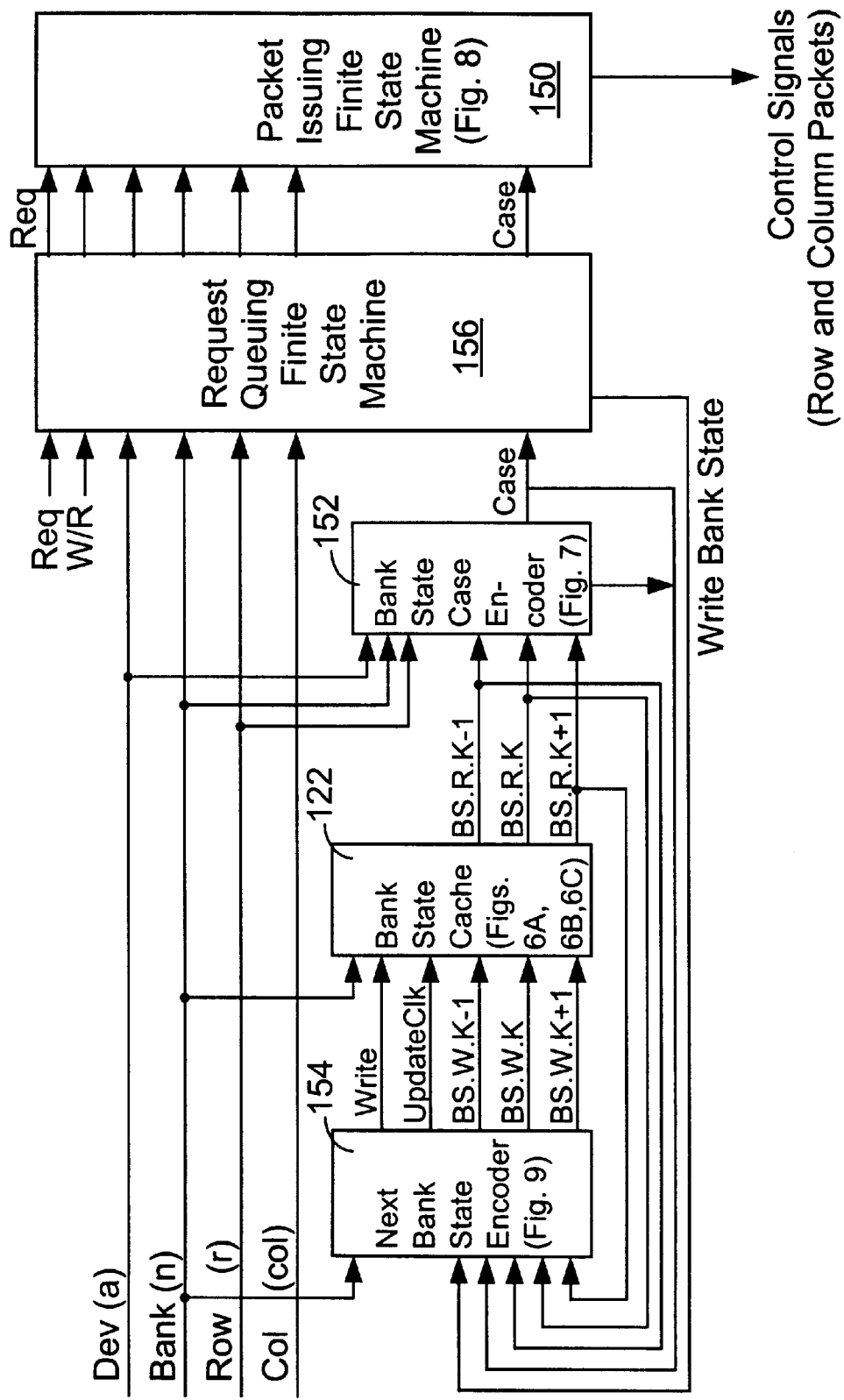
FIG. 5 is a more detailed block diagram of the memory controller shown in FIG. 3.

Referring to FIG. 5, the memory controller receives memory access requests. While the exact format of memory access requests may vary from one implementation to the next, in a preferred embodiment the memory access request includes a request strobe signal (Req), an operation indicator (W/R), and an address. The address portion of the request includes a device address (designated as Dev or a), a bank address (designated as Bank or n), a row address (designated as Row or r), and a column address (col).

In a preferred embodiment, the cache 122 is a direct mapped cache in which the bank address portion of the received request addresses one cache entry in the cache. In other embodiments, the bank state cache could be implemented as a set associative or fully associate cache.

In response to the bank address, the bank state cache 122 simultaneously outputs three signals BS.R.K (which stands for bank state, read value, entry k), BS.R.K+1 and BS.R.K−1. Each signal contains the information from one cache entry. In the preferred embodiment, the BS.R.K signal has three fields: Open, Device and Row, while the BS.R.K+1 and BS.R.K−1 signals each have two fields: Open and Device.

The first signal BS.R.K contains the information stored in the cache entry corresponding to the specified bank address (i.e., specified by the memory request being serviced). The two additional signals (BS.R.K+1 and BS.R.K−1) contain the information stored in cache entries that potentially correspond to banks that physically neighbor the bank identified by the device address and bank address in the request. If the identified bank is the top or bottom bank of a device, then one of the two additional signals will contain null values.

It should be noted that the entries in the bank state cache 122 are addressed based solely on the bank address in the received request. Thus, the accessed entries represented by the three signals output by the bank state cache 122 may correspond to a different device than the device specified by the received request.

A state machine 150 responds to a memory access request by generating a sequence of control packets that are sent to the memory devices 110. In a RAMBUS memory system, the control packets include row packets and column packets. Row packets are used to close and precharge banks as well as to activate a specific row, while column packets are used to access specific columns of a previously activated row that has been latched into the sense amps (sense amplifiers) of a DRAM device.

Reduction logic 152, also called the bank state case encoder, is used to convert the three signals output by the bank state cache into a selection signal (Case). The selection signal indicates which of several possible sequences of control packets will need to be issued to implement the memory access request currently being serviced. From a different perspective, the selection signal controls the sequence of state transitions that take place in the state machine 150.

Next bank state encoder 154 generates modified signals that are stored back in the same cache entries that were previously accessed to generate the signals BS.R.K, BS.R.K+1 and BS.R.K−1. The modified signals are defined as follows:

BS.W.K represents the accessed bank and indicates that the bank is open;

BS.W.K+1 is a single, one bit field, Open, that indicates whether the bank corresponding to this cache entry is open or closed; and BS.W.K−1 is also single, one bit field, Open, that indicates whether the bank corresponding to this cache entry is open or closed.

A Request Queuing Finite State Machine 156 has an internal queue (not shown) for storing memory request information, including the address, operation type, and Case signal value, for each memory request received by the memory controller. It stores the information for each received request in its internal queue (not shown) and transfers them to the Packet Issuing Finite State Machine 150 when various timing and system constraints, not relevant to the present invention, have been satisfied. Each time a new memory request is received, this state machine 150 responds to storing the request, including the Case selection signal value for the request, and then asserting Write Bank State. At the next system clock cycle, the Write Bank State and system clock signal operate together to store updated bank state values in the bank state cache, as will be explained below.

Bank State Cache

Figure 6A:
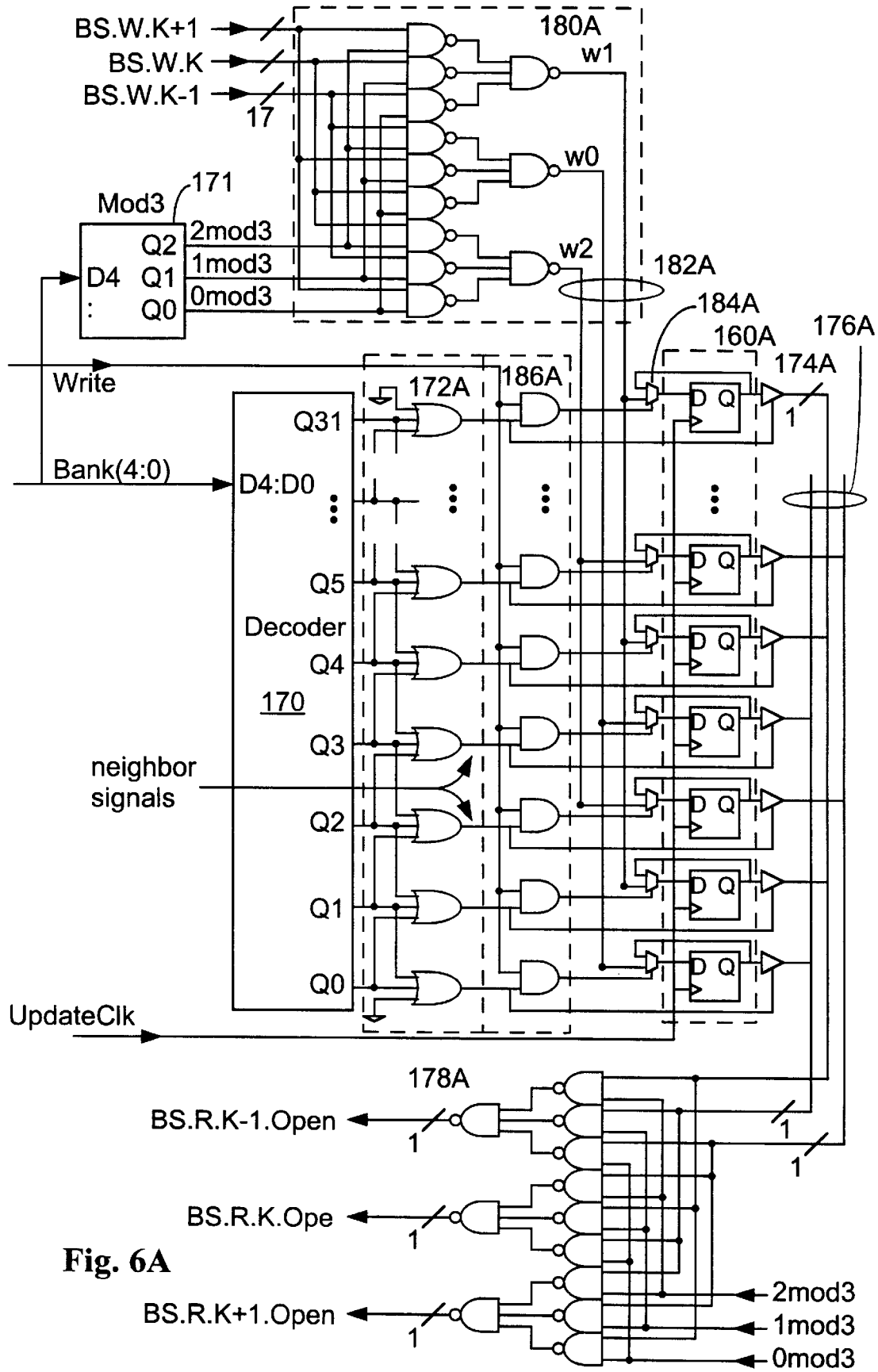
FIGS. 6A, 6B and 6C are logic circuit diagrams of a bank state cache used in the memory controller shown in FIG. 3.
Figure 6B:
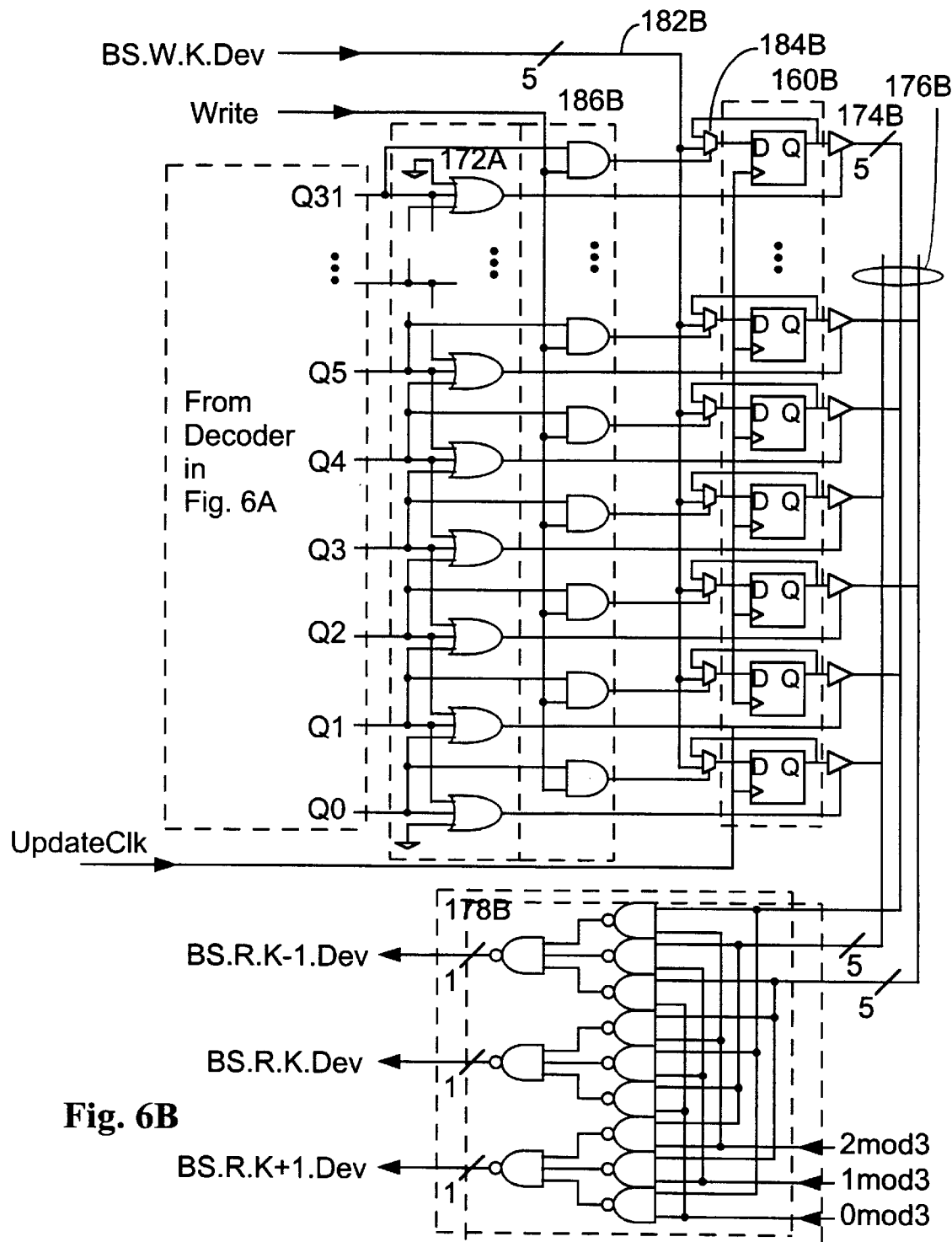
Figure 6C:
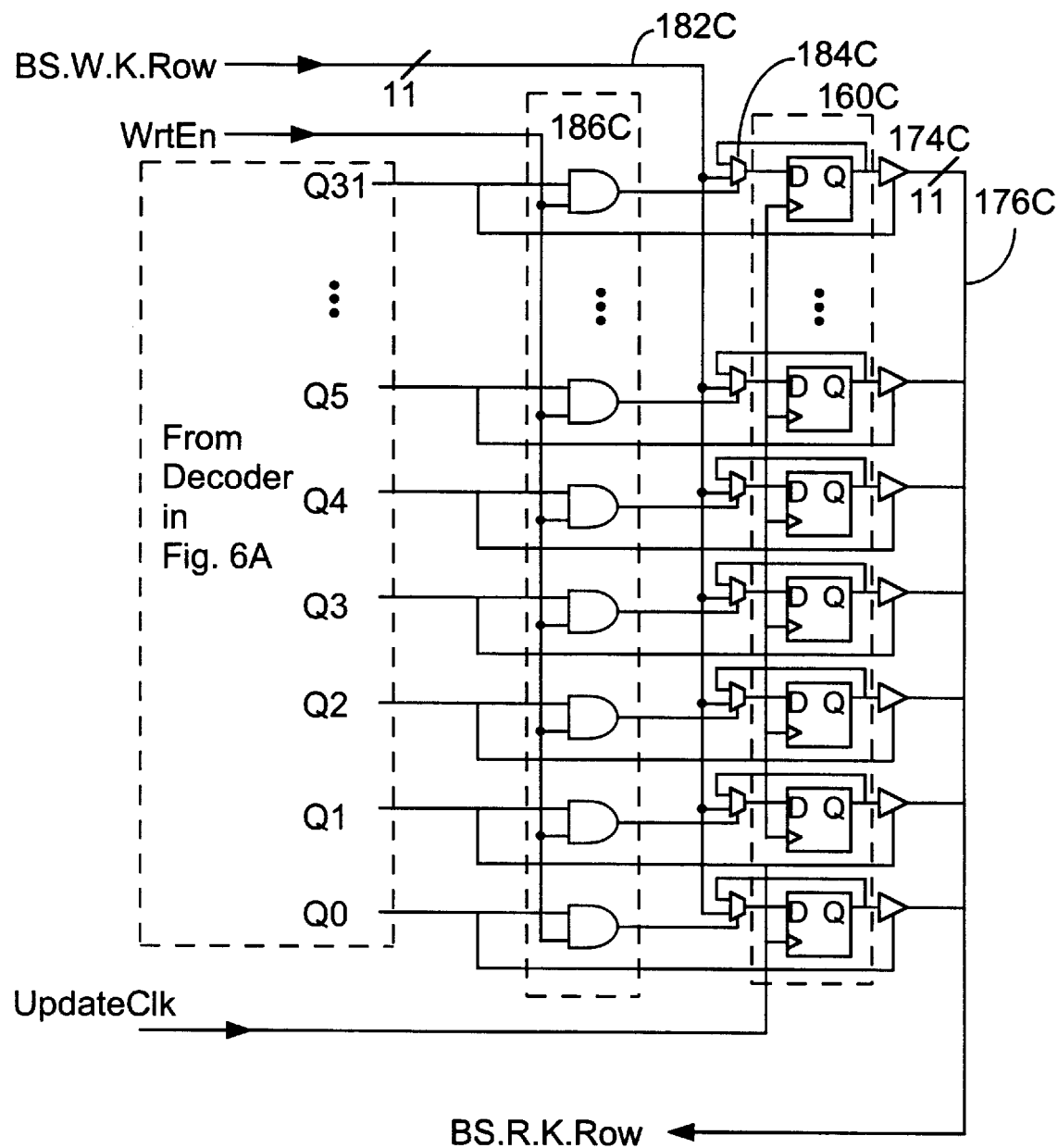

FIGS. 6A, 6B and 6C show the bank state cache 122. The reason three figures are used is that while each cache entry stores three fields of data (Open, Device, Row), different subsets of those fields are accessed for various different types of operations. FIG. 6A shows the latches 160A (i.e., memory elements) for storing the Open field of each cache entry, as well as the circuitry for simultaneously reading the Open field (one bit) of three neighboring cache entries and for simultaneously writing the Open field of the three neighboring cache entries. FIG. 6B shows the latches 160B for storing the Device field (five bits) of each cache entry, as well as the circuitry for simultaneously reading the Device field of three neighboring cache entries and for writing the Device field of just one cache entry. FIG. 6C shows the latches 160C for storing the Row field (eleven bits) of each cache entry, as well as the circuitry for simultaneously reading and writing the Row field of just one cache entry.

Referring to FIG. 6A, the portion of the bank state cache used for simultaneously reading the Open field of two or three neighboring cache entries will be described first. Then the write portion of the circuitry will be described.

A decoder 170 decodes a bank address into a set of individual cache entry select signals Q. In a preferred embodiment the bank signal has five bits, Bank (4:0) and thus there are 32 cache entry select signals Q0 to Q31; however the bit length of the bank signal and the number of cache entries may vary from one implementation to another. A second decoder 171 decodes the bank signal and generates three signals (0mod3, 1mod3, 2mod3) that indicate the value of the bank signal modulo three. 0mod3 is enabled if the bank signal modulo three is equal to 0, 1mod3 is enabled if the bank signal modulo three is equal to 1, and 2mod3 is enabled if the bank signal modulo three is equal to 2.

The open-page policy would leave each page (i.e., row of a bank) open as long as possible. If 1mod3 is enabled if the bank signal modulo three is equal to 1, and 2mod3 is enabled if the bank signal modulo three is equal to 2.

Instead of using a triple-ported memory to enable simultaneous reading of three cache entries, the present invention takes advantage of the fact that neighbor banks have adjacent bank addresses. In particular, the present invention adds parallel internal data busses and modulo-3 arithmetic logic to provide three parallel data paths into and out of a cache memory array. This results in a much simpler and less expensive cache than a triple-ported cache.

As shown in FIG. 6A, a set of OR gates 172A are each coupled to receive a cache entry select signal as well as its immediate neighbors. That is, for each cache entry select signal Q, there are logic connections for left-shifting and right-shifting the signal to generate left-shifted and right-shifted signals that are then OR'ed together. However, the top and bottom cache entry select signals Q31 and Q0 are each shifted in only one direction, since they each have only one neighbor while each of the other cache entry signals has two neighbors. The output signals from the OR gates are herein called neighbor select signals. Since only one cache entry select signal is enabled at any time, only two or three neighbor signals are enabled at any time.

Each neighbor select signal is coupled to a buffer driver 174A. As a result, the Open field from two or three cache entries are asserted on read data busses 176A and transmitted to read multiplexer 178A. There are three read data busses 176A, each of which is coupled to every third cache entry latch 160A. The read multiplexer 178A directs the three Open field values on read data busses 176A to three output signal lines in accordance with the value of "bank modulo 3." The value of "bank modulo 3" is indicated by which one of the three modulo signals (0mod3, 1mod3, 2mod3) is enabled. The three output signals are labeled BS.R.K.Open, BS.R.K+1.Open and BS.R.K−1.Open. In effect, the enabled modulo signal directs the Open value for the bank cache entry identified by the Bank (4:0) signal to the BS.R.K.Open line, directs the Open value for the neighbor (if any) above that bank cache entry to BS.R.K+1. Open, and directs the Open value for the neighbor (if any) below that bank cache entry to BS.R.K−1. Open.

Updated Open values are written into the bank state cache using a write multiplexer 180A that directs three input values (BS.W.K.Open, BS.W.K+1. Open and BS.W.K−1) onto three write data busses 182A. The write multiplexer 180A directs the three Open field values to the three write data busses 182A in accordance with the value of "bank modulo 3." The data value on each of these busses 182A is presented to every third one of the bank cache entry latches 160A via an input multiplexer 184A.

The input multiplexer 184A for each bank cache entry latch 160A re-circulates the latch output back to the latch input when the Write signal is not enabled, and presents the updated Open value on the corresponding write data bus 182A when the Write signal is enabled. More particularly, the Write signal is logically AND'ed with the neighbor signals output by the OR gates 172A to generate two or three enabled Mux select signals when the Write signal is enabled, which in turn causes the multiplexers 184A that receive enabled Mux select signals to output the data on the corresponding write data busses 182A. The write data busses 182A are coupled to the "1" inputs of multiplexers 184A, while the re-circulated cache data is coupled to the "0" inputs of these multiplexers 184A. Thus the AND gates 186A in combination with the multiplexers 184A channel the updated Open values to only the bank cache entry latches corresponding to the enabled neighbor signals.

The purpose of the UpdateClk is to latch the data presented by multiplexers 184A into the bank state cache entry latches 160A.

FIG. 6B shows the circuitry for reading and writing device (Dev) field values from and to the bank state cache entries. This circuit works identically to the one in FIG. 6A, except as noted next. The read data busses 176B in this circuit are each five bits wide, because that is the width of the Dev value stored in the cache entry latches 160B, and the read multiplexer 178B is the same as the read multiplexer 176A in FIG. 6A except that it is five bits wide. There is no write multiplexer in this circuit because only one Dev value (BS.W.K.Dev) is stored in the cache at a time, and furthermore because BS.W.K.Dev is written only to the selected cache work, not its neighbors. Therefore there is only one write data bus 182B, which is five bits wide and coupled to the "1" port of all the input multiplexers 184B. Also, since only one Dev value is being written into the cache, the decoded cache word select signals Q0 to Q31 (from the decoder in FIG. 6A) are connected directly to inputs of the Write enable AND gates 186B. Neighbor signals are not needed in this circuit. Note that OR gates 172A are shown in FIG. 6B only to aid understanding of the circuit, but are actually the same gates as those shown in FIG. 6A (i.e., there is no need for a second set of thirty-two OR gates).

FIG. 6C shows the circuitry for reading and writing row (Row) field values from and to the bank state cache entries. This circuit works identically to the one in FIG. 6B, except as noted next. There is only one read data bus 176C and one write data bus 182C in this circuit, and each are eleven bits wide, because that is the width of the Row value stored in the cache entry latches 160C. There is no write multiplexer and no read multiplexer because only one Row value is read from the cache at a time and only one Row value is written into the cache at a time. Similarly, the neighbor signals produced by OR gates 172A are not used in this circuit because only one Row value is read from the cache at a time.

Reduction Circuitry—Bank State Encoder

The information read from the bank state cache identifies the device, row and open state of the cache entry corresponding to the Bank field of the address specified by the memory request being serviced. The information read also includes the open and device fields for the bank state entries corresponding to bank values one greater and one less than the Bank field of the specified address. These data fields read from the bank state cache are labeled in the Figures as follows:

BS.R.K.Open open field of entry corresponding to specified bank
BS.R.K.Dev device field of entry corresponding to specified bank
BS.R.K.Row row field of entry corresponding to specified bank
BS.R.K+1.Open open field of entry (if any) for bank+1
BS.R.K+1.Dev device field of entry (if any) for bank+1
BS.R.K−1.Open open field of entry (if any) for bank−1
BS.R.K−1.Dev device field of entry (if any) for bank−1

Referring to Table 1, the set of row packets that must be sent to the memory devices to service the pending memory request depends on a number of factors. The following is a brief description of six different situations, corresponding to different states of the banks in the memory devices with respect to the pending memory request.

Cases 1 and 2 apply when the bank state cache contains an entry for the bank corresponding to the specified address (i.e., specified by the memory request), and the bank is already open. In Case 1 (which applies when there is a page hit) the row needed to service the memory request has already been activated (stored in the sense amplifiers for the bank), and therefore no row packets are needed to prepare the memory devices for this memory request. In Case 2 the identified row has not yet been activated, and therefore two row packets are needed: a Precharge packet to precharge the identified bank and an Activate packet to activate the identified row.

Cases 3 and 4 apply when the bank state cache does not contain an entry for the bank corresponding to the specified address, which means that the needed bank is closed, and furthermore the cache entry for the identified bank contains data for a different bank that is open. If neither neighbor of the identified bank is open, which is Case 3, then the identified bank is already precharged. Thus, in Case 3, two row packets are needed: an Activate packet to activate the identified row of the identified bank, and a Precharge packet to close the bank of the device identified by the cache entry for the identified bank. If either neighbor of the identified bank is open, which is Case 4, then one or both neighbor banks must be closed. In Case 4 three row packets are needed: a Precharge packet to precharge the identified bank (which also closes the neighbor bank or banks of the identified bank), an Activate packet to activate the identified row, and a Precharge packet to close the bank of the device identified by the cache entry for the identified bank.

Cases 5 and 6 apply when the cache entry for the identified bank indicates that the bank for which the cache entry contains state information is closed (i.e., not open). Note that this cache entry may contain data either for the bank of the device being accessed or for another device. Since the bank identified by the cache entry is closed, it makes no difference whether the entry is for the device being addressed or a different device. If neither neighbor of the identified bank is open, which is Case 5, then the identified bank is already precharged. Thus, in Case 5, just one row packet is needed: an Activate packet to activate the identified row of the identified bank. If either neighbor of the identified bank is open, which is Case 6, then one or both neighbor banks must be closed. In Case 6 two row packets are needed: a Precharge packet to precharge the identified bank (which also closes the neighbor bank or banks of the identified bank), and an Activate packet to activate the identified row.

After the zero to three row packets have been generated and sent to the memory devices, a column packet is sent to access a portion of the device, bank and row identified by the memory request.

device value BS.R.K.Dev read from the cache entry for the specified bank. A Row Match signal is generated by a comparator 200-2 that outputs an enabled Row Match signal when the specified row address (Row) is equal to the row value BS.R.K.Row read from the cache entry for the specified bank.

A Neighbor Open signal is generated by comparators 200-3 and 200-4 and gates 202, 204, 206. Comparators 2003- and 200-4 compare the specified device address (Dev) with the device values BS.R.K−1.Dev and BS.R.K+1.Dev read from the cache entries for the neighbor banks.

The resulting signals, Device K-1 Match and Device K+1 Match, are logically AND'ed with the corresponding Open values read from the cache (BS.R.K−1.Open and BS.R.K+1.Open) by AND gates 202, 204, and the resulting signals are logically OR'ed by OR gate 206 to generate the Neighbor Open signal.

AND gates 210 are used to generate the six Case signals in accordance with the following boolean equations (where the symbol "&" represents the logical AND operator):

Case(1)=BS.R.K.Open & Device Match & Row Match
Case(2)=BS.R.K.Open & Device Match & Not(Row Match)
Case(3)=BS.R.K.Open & Not(Device Match) & Not (Neighbor Open)
Case(4)=BS.R.K.Open & Not(Device Match) & Neighbor Open
Case(5)=Not(BS.R.K.Open) & Not (Neighbor Open)
Case(6)=Not(BS.R.K.Open) & Neighbor Open The Case() signals are collectively called the selection signal. For each memory request, only one of the Case() signals is active (enabled).

PACKET ISSUING STATE MACHINE

Figure 8:
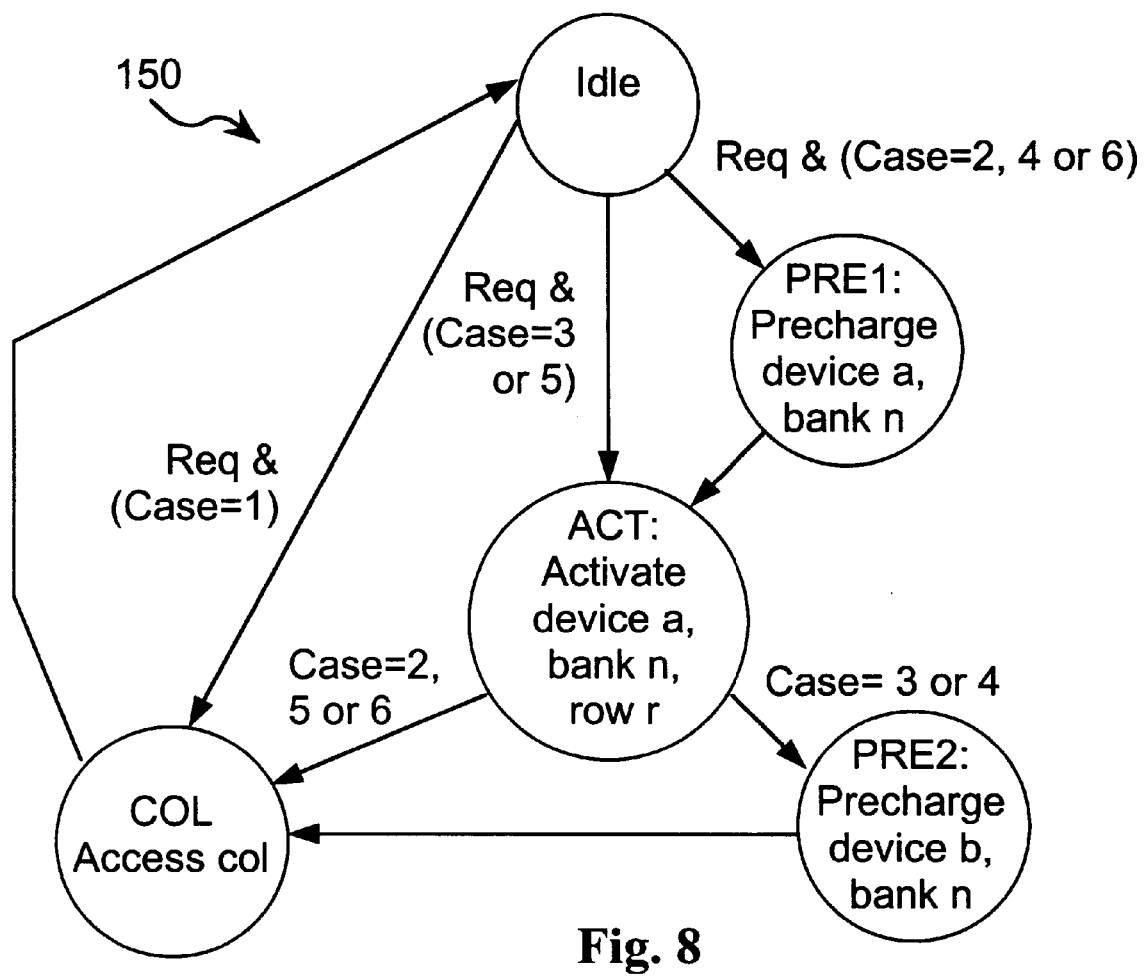
FIG. 8 is a state diagram for a finite state machine that issues control packets to memory devices.

Referring to FIG. 8, the state machine 150 for generating and transmitting control signals, also called control packets

TABLE 1

| | BEFORE opening dev, bank, row = a, n, r | | | | | AFTER opening dev, bank, row = a, n, r | | | | | Resulting |
|---|---|---|---|---|---|---|---|---|---|---|---|
| | k | | | k + 1, k − 1 | | k | | | k + 1, k − 1 | | Row |
| Case | s | dev | row | s | dev | row | s | dev | row | s | dev | row | Packets |
| 1 | open | a | r | x | x | x | open | a | r | — | — | — | none |
| 2 | open | a | not r | x | x | x | open | a | r | — | — | — | PRE a, n ACT a, n, r |
| 3 | open | b ≠ a | x | neither neighbor open | | x | open | a | r | — | — | — | ACT a, n, r PRE b, n |
| 4 | open | b ≠ a | x | one or both neighbors open | | x | open | a | r | not open | — | — | PRE a, n ACT a, n, r PRE b, n |
| 5 | not open | x | x | neither neighbor open | | x | open | a | r | — | — | — | ACT a, n, r |
| 6 | not open | x | x | one or both neighbors open | | x | open | a | r | not open | — | — | PRE a, n ACT a, n, r |

Figure 7:
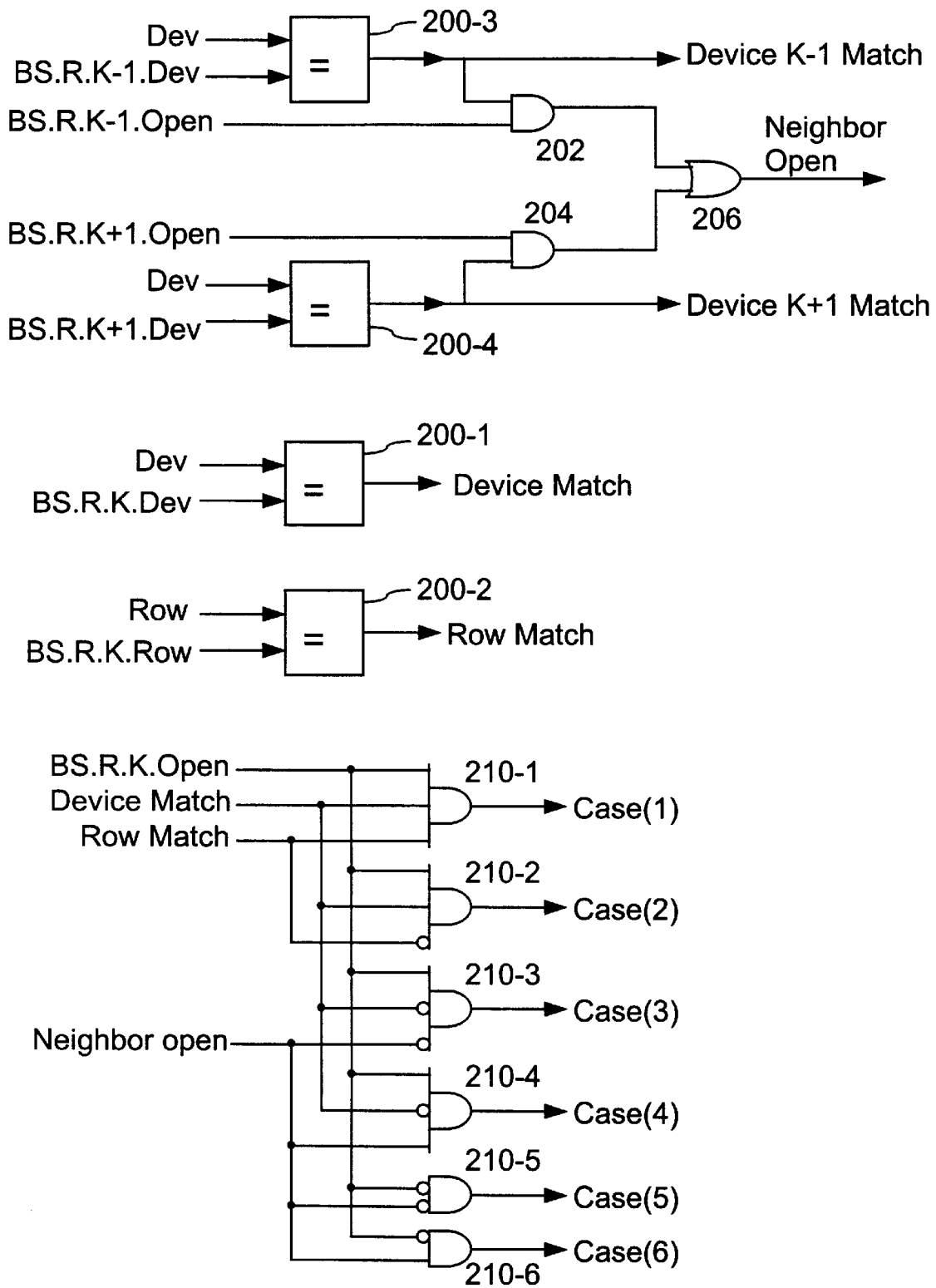
FIG. 7 is a logic circuit diagram of reduction logic, also called a bank state encoder, that converts data retrieved from a bank state cache into a selection signal.

Legend for Table 1:
s, dev, row field of each bank cache word (bank state, device, row)
Bank state(s) can be "open" or "not open"
x don't care
— no change
a, b device addresses
r row address
n bank address Referring to FIG. 7, the precursor signals used to generate a case selection signal Case(6:1) are generated using a set of comparators 200 and a few logic gates 202, 204, 206. In particular, a Device Match signal is generated by a comparator 200-1 that outputs an enabled Device Match signal when the specified device address (Dev) is equal to the or row and column packets, has five states. It should be noted here that the state machine shown in FIG. 8 only contains the states for handling read and write memory access requests, and does not contain the states for other operations such as memory refresh. It should be noted that the state machine 150 may stay in each of its states for multiple system cycles. This may happen, for instance, to satisfy timing constraints of the memory devices.

The state machine remains in the Idle state when not servicing a memory request. When a request is received from the Request Queuing Finite State Machine 156, indicated by the Req signal, the state machine transitions to the PRE1 state, for issuing a bank precharge row packet, if the selection signal Caseo is equal to Case 2, 4 or 6. If the selection signal is equal to Case 3 or 5 the state machine transitions to the ACT state, for issuing a row activation row packet, and if the selection signal is equal to Case 1 the state machine transitions to the COL state for issuing a column packet.

From the PRE1 state, after issuing a bank precharge row packet the state machine transitions to the ACT state. From the ACT state, after issuing a row activation row packet the state machine transitions to the PRE2 state if the selection signal is equal to Case 3 or 4, and otherwise transitions to the COL state. In the PRE2 state the state machine issues a bank precharge row packet for precharging the bank of the device identified by the cache entry BS.R.K read from the bank state cache, which is a different device from the one identified by the memory request currently being serviced. From the PRE2 state the state machine transitions to the COL state, and from the COL state the state machine transitions back to the IDLE state.

NEXT BANK STATE ENCODER

Figure 9:
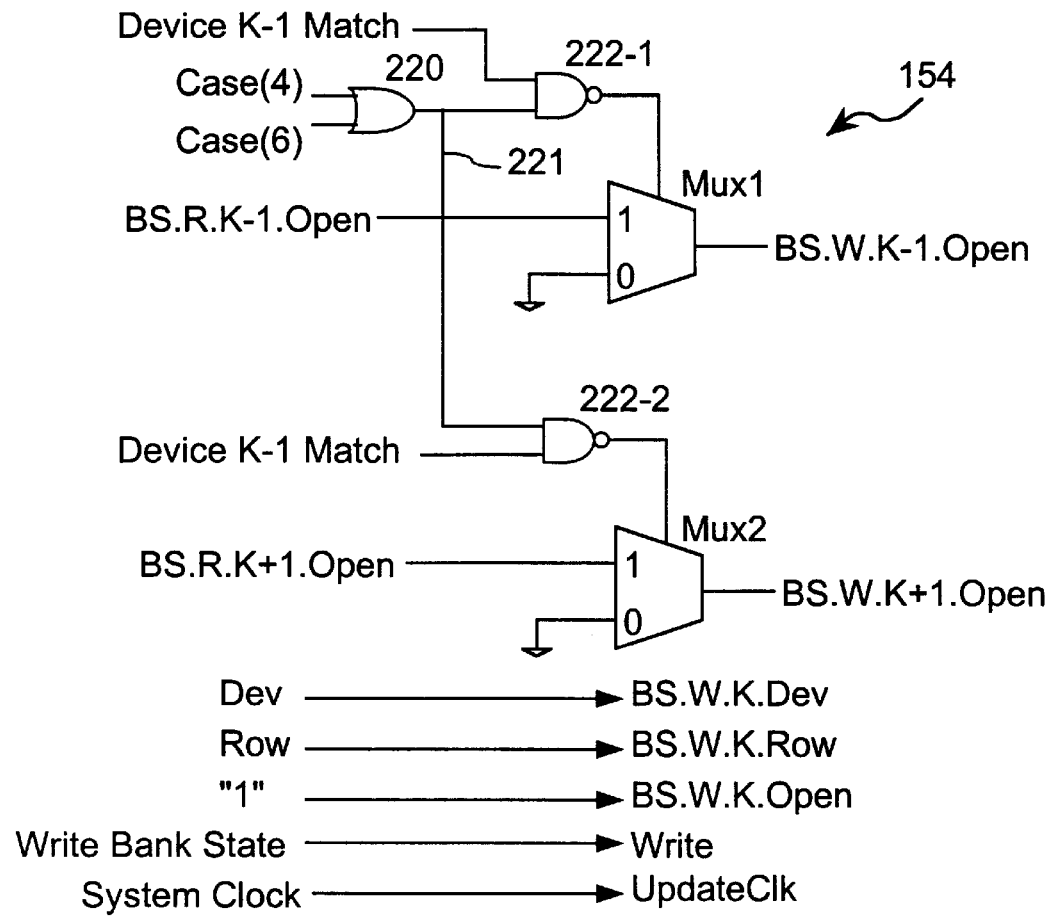
FIG. 9 is a logic circuit diagram of logic for generating data to be written into the bank state cache.

Referring to FIG. 9, the Next Bank State Encoder 154 generates the data to be written back into the bank state cache 122 (FIG. 5) as well as the Write and UpdateClk control signals. OR gate 220 logically OR's the Case(4) and Case(6) signals, and outputs a signal on line 221 that is equivalent to the Neighbor Open signal. This signal is logically NAND'ed with the Device K1 Match and Device K+1 Match signals by NAND gates 222 to generate a pair of multiplexer selection signals for multiplexers MUX1 and MUX2, respectively. The MUX1 and MUX2 multiplexers output the BS.W.K−1.Open and BS.W.K+1.Open values that are written into the K−1 and K+1 cache entries at the end of the memory access cycle.

From a functional or result viewpoint, if Neighbor Open and Device K−1 Match are both True, then the Open field of the K−1 (i.e., bank-1) cache entry is set to False because that bank has been closed. If either Neighbor Open or Device K−1 Match is False, the previous value of the Open field for the K−1 cache entry is left unchanged. The same logic is applied to the Open field for the K+1 cache entry.

The BS.W.K.Dev signal is equal to the specified device address, Dev, the BS.W.K.Row signal is equal to the specific row address, Row, and the BS.W.K.Open signal is set to "1".

The Write signal for opening the write data path in the bank state cache is enabled when the Request Queuing Finite State Machine 156 (FIG. 5) issues a Write Bank State signal. This happens after a memory request has been received and the request, including the Case selection signal value for the request, have been stored in Request Queuing Finite State Machine's internal queue. The UpdateClk signal for accessing the bank state cache is the same as the system clock in the preferred embodiment. After each memory request is received, the Write and UpdateClk signals operate together to store updated bank state values in the bank state cache.

ALTERNATE EMBODIMENTS

Many minor changes could be made to the preferred embodiment without changing the basic operation of the invention. Some of these changes have been mentioned above, such as changing the bit width of the device and row fields. Other possible changes might change the format of various signals or logically combine them in different ways. For instance, the selection signal Case() may be encoded as a three bit value, using a conventional encoder circuit, before it is used by the state machine. Replacing the bank state cache with a set associative or fully associative cache would require changes to the cache circuitry.

Figure 10:
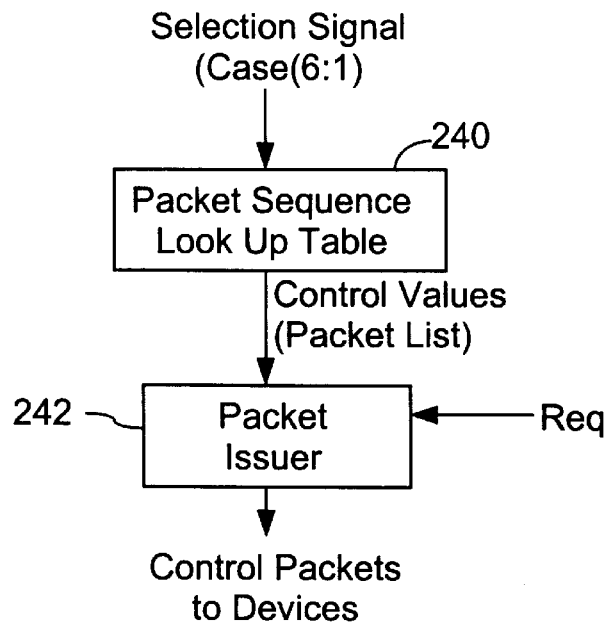
FIG. 10 is a block diagram of an alternate embodiment of circuitry for issuing control packets to memory devices.

In an alternate embodiment, shown in FIG. 10, the state machine 150 is replaced by a lookup table 240 and a packet issuer 242. The lookup table 240 outputs one or more control values in response to the selection signal Case(). In other words, the lookup table stores either six control values or six sets of control values in locations corresponding to the six possible values of the selection signal. In one implementation, the selection signal would be first encoded as a three bit value using a convention encoder, and then the resulting three bit value would be used as an address for looking up a control value in a lookup table. The one or more control values indicate the set of row packets to be issued. The packet issuer 242 outputs, in sequence, the zero to three row packets indicated by the one or more control signals and then issues a column packet.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A memory controller for controlling a plurality of dynamic memory devices, each of the dynamic memory device having a plurality of adjacent dependent banks of memory cells, comprising:

a cache for storing a plurality of entries, each cache entry corresponding to one bank in one of the dynamic memory devices, each cache entry storing information indicating which of the dynamic memory devices the entry corresponds to, whether the bank to which the entry corresponds is open, and which row of the bank was last accessed;

bank status lookup logic, coupled to the cache, for responding to a memory access request that includes an address that includes a bank address, a device address and a row address by retrieving first information from an entry, if any, in the cache corresponding to the device address and bank address, and for simultaneously retrieving second information from entries, if any, in the cache for banks physically adjacent to the bank identified by the device address and bank address;

reduction logic for converting the first and second information into a selection signal;

control signal generation circuitry for generating a sequence of control signals in accordance with the selection signal, wherein different values of the selection signal cause the control signal generation circuitry to generate different sequences of control signals.

2. The memory controller of claim 1, wherein when the second information indicates that a bank physically adjacent to the bank identified by the device address and bank address is open, the selection signal output by the reduction logic indicates that the control signals to be generated include control signals for precharging the bank identified by the device address and bank address before the row identified by the row address is accessed.

3. The memory controller of claim 2, wherein when none of the entries in the cache corresponds to the bank identified by the device address and bank address, the selection signal output by the reduction logic indicates that the control signals to be generated include control signals for precharging a bank having the same bank address and a different device address than the identified bank.

4. The memory controller of claim 1, wherein when none of the entries in the cache corresponds to the bank identified by the device address and bank address, the selection signal output by the reduction logic indicates that the control signals to be generated include control signals for precharging a bank having the same bank address and a different device address than the identified bank.

5. The memory controller of claim 1, wherein when the first information indicates that the bank identified by the device address and bank address is open, but that the row last accessed in the identified bank does not match the row address, the selection signal output by the reduction logic indicates that the control signals to be generated include control signals for precharging the bank identified by the device address and bank address before the row identified by the row address is accessed.

6. The memory controller of claim 1, wherein when the first information indicates that the bank identified by the device address and bank address is open, and that the row last accessed in the identified bank matches the row address, the selection signal output by the reduction logic indicates that the control signals to be generated includes signals for accessing the specified bank and row without precharging the bank identified by the device address and bank address.

7. The memory controller of claim 6, wherein the reduction logic includes logic for generating update signals to indicate whether entries in the cache corresponding to zero, one or two neighbors of the bank identified by the device address and bank address require updating; and the memory controller includes cache update logic for updating an entry in the cache to indicate that the bank corresponding to the device address and bank address is open, and for updating zero, one or two other entries in the cache, in accordance with the update signals, to indicate that zero, one or two banks physically adjacent to the identified bank are closed.

8. The memory controller of claim 1, the bank status lookup logic including a binary decoder that decodes the bank address into a set of binary decoded signals, logic connections for left-shifting and right-shifting the binary decoded signals to generate left-shifted and right-shifted signals, OR gates for logically ORing the binary decoded signals and the left-shifted and right-shifted signals to generate a group of neighbor select signals so as to simultaneously access a corresponding group of entries in the cache, the group of entries potentially corresponding to the identified bank and banks physically adjacent to the identified bank.

9. The memory controller of claim 8, wherein the logic connections and OR gates of the bank status lookup logic generate a group of three neighbor select signals whenever the identified bank is neither a predefined top bank nor a predefined bottom bank, and otherwise generate a group of two neighbor select signals.

10. The memory controller of claim 8, wherein the bank status lookup logic includes three parallel busses for simultaneously transmitting information from three cache entries to the reduction logic.

11. The memory controller of claim 10, wherein the bank status lookup logic includes a modulo three decode for decoding the bank address to generate a set of three binary modulo signals and steering logic that couples the three parallel busses to three ports of the reduction logic in accordance with the three binary modulo signals.

12. A method of controlling a plurality of dynamic memory devices, each of the dynamic memory device having a plurality of adjacent dependent banks of memory cells, the method comprising:

storing in a cache a plurality of entries, each cache entry corresponding to one bank in one of the dynamic memory devices, each cache entry storing information indicating which of the dynamic memory devices the entry corresponds to, whether the bank to which the entry corresponds is open, and which row of the bank was last accessed;

responding to a memory access request that includes an address that includes a bank address, a device address and a row address by retrieving first information from an entry, if any, in the cache corresponding to the device address and bank address, and simultaneously retrieving second information from entries, if any, in the cache for banks physically adjacent to the bank identified by the device address and bank address;

converting the first and second information into a selection signal; and generating a sequence of control signals in accordance with the selection signal, wherein different values of the selection signal cause the control signal generation circuitry to different sequences of control signals.

13. The method of claim 12, wherein when the second information indicates that a bank physically adjacent to the bank identified by the device address and bank address is open, the generated sequence of control signals includes control signals for precharging the bank identified by the device address and bank address before the row identified by the row address is accessed.

14. The method of claim 13, wherein when none of the entries in the cache corresponds to the bank identified by the device address and bank address, the generated sequence of control signals includes control signals for precharging a bank having the same bank address and a different device address than the identified bank.

15. The method of claim 13, wherein when none of the entries in the cache corresponds to the bank identified by the device address and bank address, the generated sequence of control signals includes control signals for precharging a bank having the same bank address and a different device address than the identified bank.

16. The method of claim 13, wherein when the first information indicates that the bank identified by the device address and bank address is open, but that the row last accessed in the identified bank does not match the row address, the generated sequence of control signals includes control signals for precharging the bank identified by the device address and bank address before the row identified by the row address is accessed.

17. The method of claim 13, wherein when the first information indicates that the bank identified by the device address and bank address is open, and that the row last accessed in the identified bank matches the row address, the generated sequence of control signals includes signals for accessing the specified bank and row without precharging the bank identified by the device address and bank address.

18. The method of claim 12, wherein the converting step includes generating update signals to indicate whether entries in the cache corresponding to zero, one or two neighbors of the bank identified by the device address and bank address require updating; and the method includes updating an entry in the cache to indicate that the bank corresponding to the device address and bank address is open, and updating zero, one or two other entries in the cache, in accordance with the update signals, to indicate that zero, one or two banks physically adjacent to the identified bank are closed.

19. The method of claim 12, including decoding the bank address into a set of binary decoded signals, left-shifting and right-shifting the binary decoded signals to generate left-shifted and right-shifted signals, logically ORing the binary decoded signals and the left-shifted and right-shifted signals to generate a group of neighbor select signals so as to simultaneously access a corresponding group of entries in the cache, the group of entries potentially corresponding to the identified bank and banks physically adjacent to the identified bank.

20. The method of claim 19, including generating a group of three neighbor select signals whenever the identified bank is neither a predefined top bank nor a predefined bottom bank, and otherwise generating a group of two neighbor select signals.

* * * * *